INVENTOR:
HAROLD D. HARRIS

Sept. 9, 1969 H. D. HARRIS 3,465,828
POWER DRIVEN CULTIVATOR
Filed April 14, 1967 3 Sheets-Sheet 2

INVENTOR:
HAROLD D. HARRIS
BY:

Sept. 9, 1969  H. D. HARRIS  3,465,828
POWER DRIVEN CULTIVATOR
Filed April 14, 1967  3 Sheets-Sheet 3

INVENTOR:
HAROLD D. HARRIS
BY:

United States Patent Office
3,465,828
Patented Sept. 9, 1969

3,465,828
POWER DRIVEN CULTIVATOR
Harold D. Harris, Lubbock, Tex., assignor to Harris and Thrush Manufacturing Company, Lubbock, Tex., a corporation of Texas
Filed Apr. 14, 1967, Ser. No. 630,859
Int. Cl. A01b 49/02, 33/16, 33/10
U.S. Cl. 172—70
4 Claims

ABSTRACT OF THE DISCLOSURE

The cultivator has a plurality of earth working reels with at least one reel for each bed of the land. The reels are rotated from the power take off of the tractor rather than solely by contact with the soil. A planting attachment may be connected to the cultivator behind the reels. If the cultivator is used to cultivate growing crops, a space is provided on the cultivator for the drill and shields prevent dirt from covering the growing crops.

BACKGROUND OF THE INVENTION

Field of the invention.—This invention relates to cultivators for cultivating row crops wherein the crop is planted and grows upon the top of the bed and, more particularly, for a cultivator which chops the ground with rotating reels.

Description of the prior art.—In recent years, considerable new farming equipment has come into commercial use for planting one or two rows of crop upon the top of beds. Often this equipment uses a sled-like apparatus to shape the contour of the beds and to very accurately position the opening shovel of a planter for precision placement of the seed. Previous workers, e.g., Sternman, U.S. Patent No. 1,870,932, have suggested using such choppers. Others have suggested that these reels be power driven.

SUMMARY

This application discloses an improved drive for rotating the reels, as well as guide discs for accurately placing the opening shovel of the planter or the dirt shield of the cultivator. The height of the cultivator is regulated by elongated skids which fit into the furrow. The use of the guide discs and skids eliminates the sled-like smoothing arrangement of the prior art which leaves the field in an undesirable tilth.

An object of this invention is to provide an earth working implement having the above beneficial features.

Further objects are to achieve the above with a device that is sturdy, compact, durable, simple, safe, versatile, and reliable, yet inexpensive and easy to manufacture, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
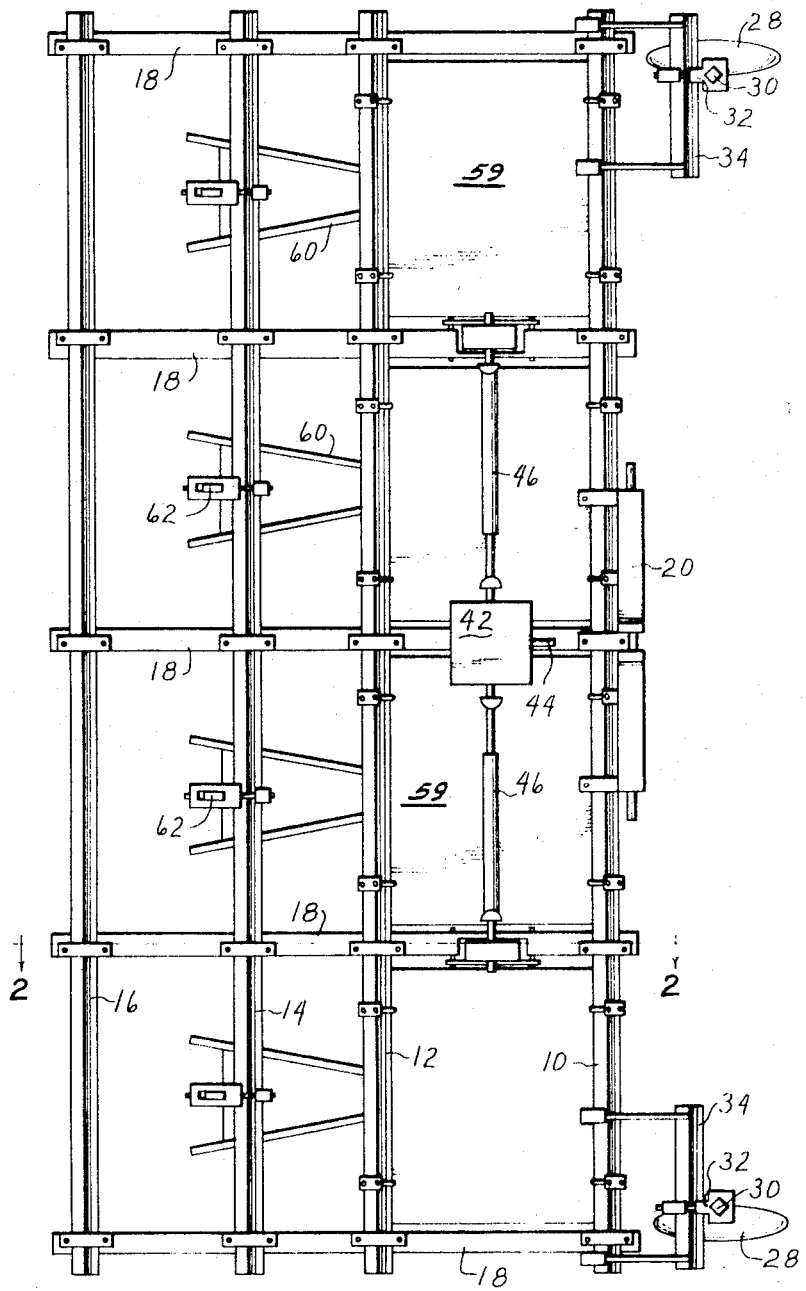
FIG. 1 is a plan view of a cultivator according to this invention.
Figure 2:
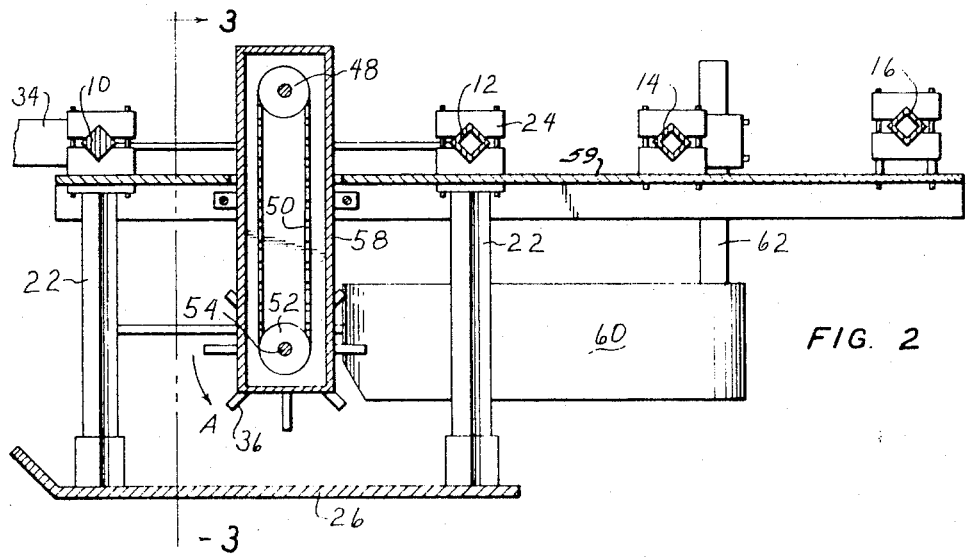
FIG. 2 is a sectional view thereof taken on line 2—2 of FIG. 1.
Figure 3:
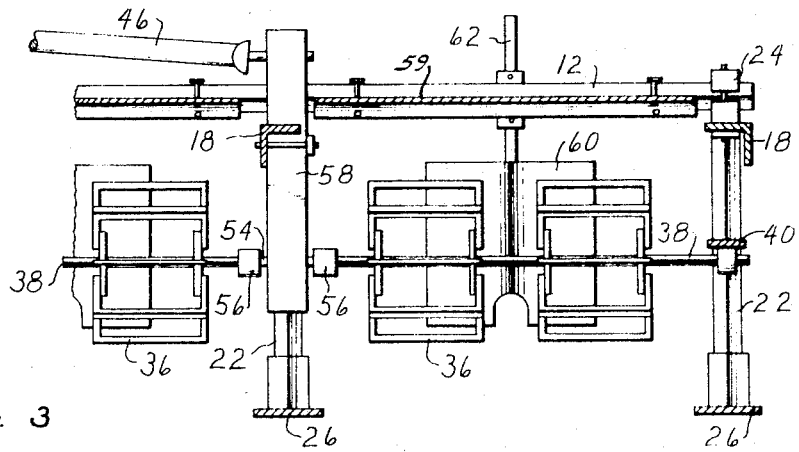
FIG. 3 is a partial sectional view thereof taken on line 3—3 of FIG. 2.
Figure 4:
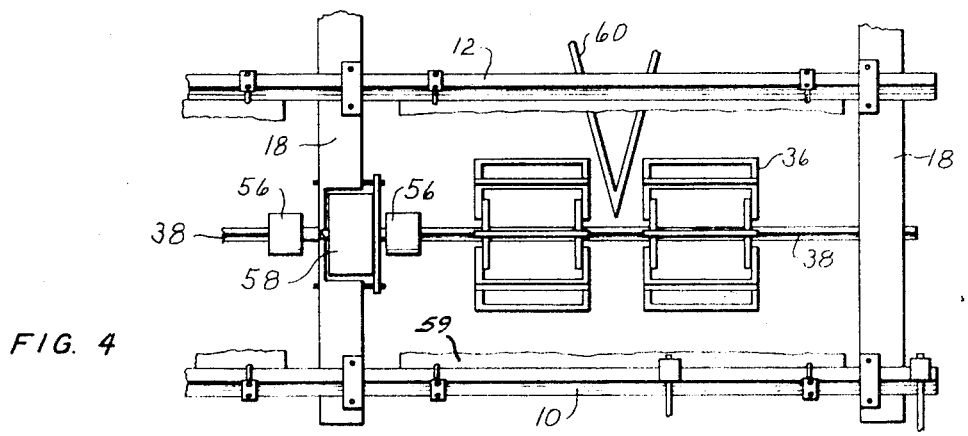
FIG. 4 is a top detailed view with parts broken away for clarity.
Figure 5:
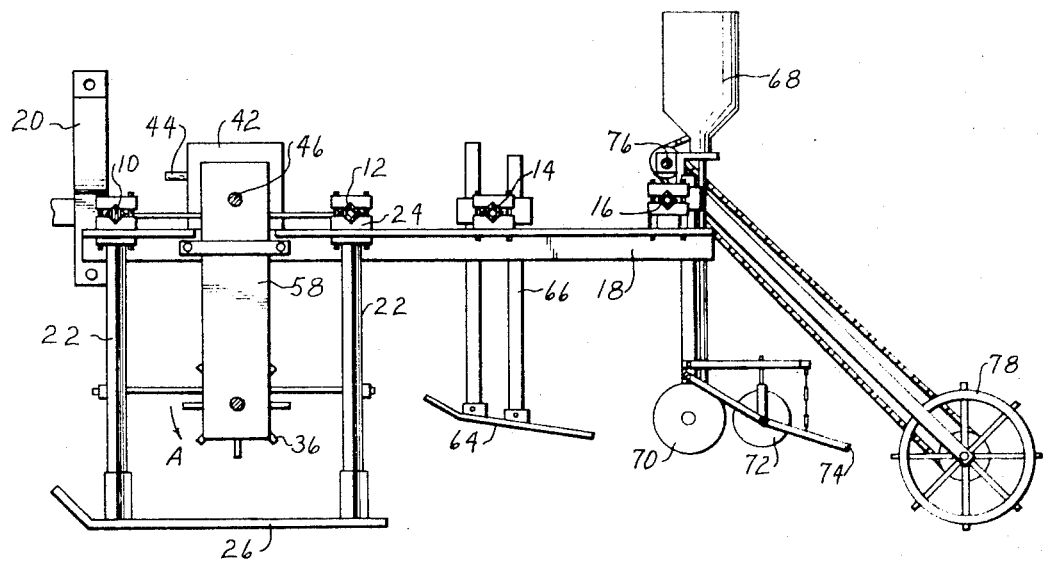
FIG. 5 is a sectional view, similar to FIG. 2, with the cultivator rigged for planting.

The cultivator has a framework which includes four longitudinal tool bars 10, 12, 14, and 16 which are horizontal and transverse to the direction of draft. The bars are parallel and are connected together by horizontal connecting bars 18 which are bolted to each tool bar below the tool bars. Three-point hitch 20 attached to the forward top side of the frame forms means for moving the frame with the direction of draft parallel to the connecting bars 18 and normal to the tool bars.

Shanks 22 are attached by clamps 24 dependingly from the front tool bar 10 and the next to front tool bar 12. Skids 26 on the bottom of the shanks 22 are adapted to ride in the bottom of the furrow to maintain the frame at the proper height above the ground.

Guide discs 28 are journaled to rotate upon guide shanks 30. These guide shanks are attached by clamp 32 to front bar 34. The front bars 34 are parallel to the tool bars and attached in front of the front tool bar 10 by suitable structure. Although the guide discs will regulate the depth to some degree, their primary function is to guide the frame horizontally so that the equipment attached to the frame always maintains a uniform relationship to the beds and furrows.

At least one reel 36 is mounted between each skid 26 and the adjacent skid. Preferably, if a single row of crop is to be planted upon a bed, two reels 36 are used with a space between them in the center of the bed for the drill. If two rows of crop are planted upon each bed, three reels 36 would be employed, leaving two spaces for the two rows of crop. Axles 38, upon which the reels 36 are mounted, are journaled in suitable bearing hangers 40, which are attached to the tool bars 10 and 12.

In a four-bed implement as shown in the drawing, right angle gear box 42 is mounted on top of the tool bars 10 and 12 at the center of the implement. Shaft 44 extends forward from the gear box 42 and is adapted to be attached to the power take off of the tractor to which the implement is attached. Horizontal shafts 46, transverse to the direction of draft, extend to either side of the gear box 42 and terminate with chain sprocket 48 on each side. The chain 50 on the sprocket 48 extends down to sprocket 52 which is mounted on stub shaft 54. The stub shaft is mounted between the reels for adjacent beds; i.e., the stub shaft 54 is mounted over one of the skids 26. Flexible connection 56 connects the stub shaft to a reel axle 38 on each side.

Each reel axle is independent for minor flexing with respect to the remaining reel axles. Also, each reel axle need only have enough strength to be self-supporting and only one reel is driven through any reel axle. The gearing is arranged so that the reels turn in the direction of Arrow A so that the peripheral speed of the reels is higher than that of the implement. Thus, the reels will cultivate the soil and throw some dirt to the rear.

The sprockets 48 and 52 and the chain 50 are totally enclosed within a box 58 which contains oil so that the chain is free of dust and always lubricated.

According to one embodiment, V shaped dirt shield 60 is dependingly attached from the penultimate tool bar 14 by shield shank 62. A shield is provided for each row of crop, i.e., if there were three reels per bed for two rows of growing crop, two shields 60 would be provided for each bed, one shield centered over each row. Stated otherwise, the shields are aligned with spaces between the reels 36. The shields have the V configuration when viewed from above. The point of the V is very close to the perimeter of the reel. The bottom of the V is about level with the top of the bed or, stated otherwise, slightly higher than the bottom of the reel 36. Due to the shape and location of the shield 60, it prevents dirt from the reels from covering the growing crops. Inasmuch as the guide discs 28 accurately guide the implement with respect to the beds and the skids 26 accurately regulate the height of the implement, the shields 60 are very accurately placed in spaced relationship to the drill.

In the other embodiment, the same basic implement defined above is used, except that it is rigged as a planter. The V shields 60 with their shanks 62 are removed from the penultimate tool bar 14 and smoothing plate 64 is attached by smoothing shank 66 to the penultimate tool bar 14. The smoothing plate is a flat metal plate with the lower or trailing edge horizontal normal to the direction of draft. The smoothing plate will smooth the top of the bed, bringing it to a uniform height, and perhaps remove a little of the dry soil from the top. Planter attachment 68 is attached to the back tool bar 16. Inasmuch as planting attachments are well known to the agricultural arts, they will not be described in detail here, except to note that they employ the customary seed box 68, opening discs 70 (which are the equivalent of opening shovels), press wheels 72, and covering drags 74. The planting attachments are driven from shaft 76 which is rotated by wheel 78 which runs in the center furrow.

Thus it may be seen that I have provided a simple but effective agricultural implement for precision farming.

It will be apparent that the embodiments shown are only exemplary and that various modifications can be made in operation, construction, materials, and arrangement within the scope of the invention as defined in the appended claims.

I claim as my invention:
1. In an agricultural earth working machine having
   (a) a frame of
      (i) a plurality of horizontal bars
      (ii) connected together parallel to each other and
      (iii) a three point hitch attached to the bars so as to form
      (iv) means for moving the frame with the direction of draft transverse to the bars, and
   (b) a plurality of earth working reels
      (i) dependingly connected to the frame,
      (ii) an axle of each reel journaled for rotation, and
      (iii) the axle of each transverse to the direction of draft;
   (c) the improvement comprising in combination:
   (d) a gear box
      (i) mounted on the frame with
      (ii) a shaft extending therefrom in the direction of draft
      (iii) adapted to connect to the power take-off of a tractor, and
      (iv) two additional shafts,
      (v) one extending to each side of the gear box
      (vi) transverse to the direction of draft, and
   (e) a chain drive
      (i) on each side
      (ii) extending from said shaft on that side
      (iii) to the axles of the reels on the same side,
   (f) at least two reels spaced apart and adapted to work each bed of the land to be cultivated, and
   (g) at least one plant shield attached to the frame for each bed,
   (h) the shield being
      (i) V shaped sheet material
      (ii) with the point of the V in the direction of draft,
      (iii) immediately behind the reels, and
      (iv) following in the space between reels.

2. The invention as defined in claim 1 with the additional limitations of
   (j) gauge skids attached to the frame
   (k) between some of the reels
   (m) extending below the reels
   (n) to ride in the bottom of a furrow to properly regulate the height of the reels.

3. The invention as defined in claim 1 with the additional limitations of
   (j) at least two guide discs attached to the frame
   (k) forward of the reels,
   (m) said guide discs forming means for guiding the frame so that the reels are properly related to the beds and furrows.

4. The invention as defined in claim 3 with the additional limitations of
   (n) gauge skids attached to the frame
   (o) between some of the reels
   (p) extending below the reels
   (q) to ride in the bottom of a furrow to properly regulate the height of the reels.

References Cited

UNITED STATES PATENTS

| | | | |
|---|---|---|---|
| 1,092,377 | 4/1914 | McAtee | 172—157 |
| 3,252,522 | 5/1966 | Taylor | 172—701 X |
| 3,347,188 | 11/1967 | Richey | 111—10 |
| 3,398,707 | 8/1968 | McClenny | 172—540 X |

ROBERT E. PULFREY, Primary Examiner

S. C. PELLEGRINO, Assistant Examiner

U.S. Cl. X.R.

172—112, 156, 393, 508